United States Patent
Wedajo et al.

(10) Patent No.: US 9,524,438 B2
(45) Date of Patent: Dec. 20, 2016

(54) VEHICLE AND METHOD FOR OPERATING A CAMERA ARRANGEMENT FOR A VEHICLE

(75) Inventors: Brouk Wedajo, La Ferte Saint Aubin (FR); Yan Quelquejay, Ris Orangis (FR); Samia Ahiad, Gagny (FR); Caroline Robert, Paris (FR)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 481 days.

(21) Appl. No.: 14/117,919

(22) PCT Filed: May 16, 2011

(86) PCT No.: PCT/EP2011/057850
§ 371 (c)(1),
(2), (4) Date: Mar. 14, 2014

(87) PCT Pub. No.: WO2012/155956
PCT Pub. Date: Nov. 22, 2012

(65) Prior Publication Data
US 2014/0184798 A1    Jul. 3, 2014

(51) Int. Cl.
*H04N 7/18* (2006.01)
*G06K 9/00* (2006.01)

(52) U.S. Cl.
CPC .................. *G06K 9/00791* (2013.01)

(58) Field of Classification Search
CPC ................................. G06K 9/00791
USPC ........................................ 348/148
See application file for complete search history.

(56) References Cited

U.S. PATENT DOCUMENTS

| | | | |
|---|---|---|---|
| 7,656,277 B2 * | 2/2010 | Kawasaki | G06K 9/00798 340/425.5 |
| 2006/0159309 A1 * | 7/2006 | Tsukamoto | B60Q 1/1423 382/104 |
| 2007/0024467 A1 * | 2/2007 | Fujii | G06K 9/00697 340/937 |

(Continued)

FOREIGN PATENT DOCUMENTS

| | | |
|---|---|---|
| DE | 10 2006 005 443 A1 | 2/2007 |
| JP | 2009-255722 A | 11/2009 |

OTHER PUBLICATIONS

International Search Report for corresponding International Application No. PCT/EP2011/057850, mailed Apr. 18, 2012 (3 pages).

*Primary Examiner* — Allen Wong
(74) *Attorney, Agent, or Firm* — Osha Liang LLP

(57) ABSTRACT

The invention relates to a vehicle (10) with at least one camera (16), by means of which at least one image area of a surrounding of the vehicle (10) is capturable, the image area comprising a plurality of pixels and being arranged obliquely above a vehicle front as viewed in the direction of travel of the vehicle (10), and with a tunnel detection device (44) designed for determining an average brightness of the at least one image area. The tunnel detection device (44) comprises a device (46) for feature or edge detection, by means of which differences in the brightness of pixels differing from each other are capturable and thus features characterized by abrupt changes in brightness are detectable in the at least one image area. Moreover, the invention relates to a method for operating a camera arrangement for a vehicle (10).

15 Claims, 6 Drawing Sheets

(56) References Cited

U.S. PATENT DOCUMENTS

Figure 1:
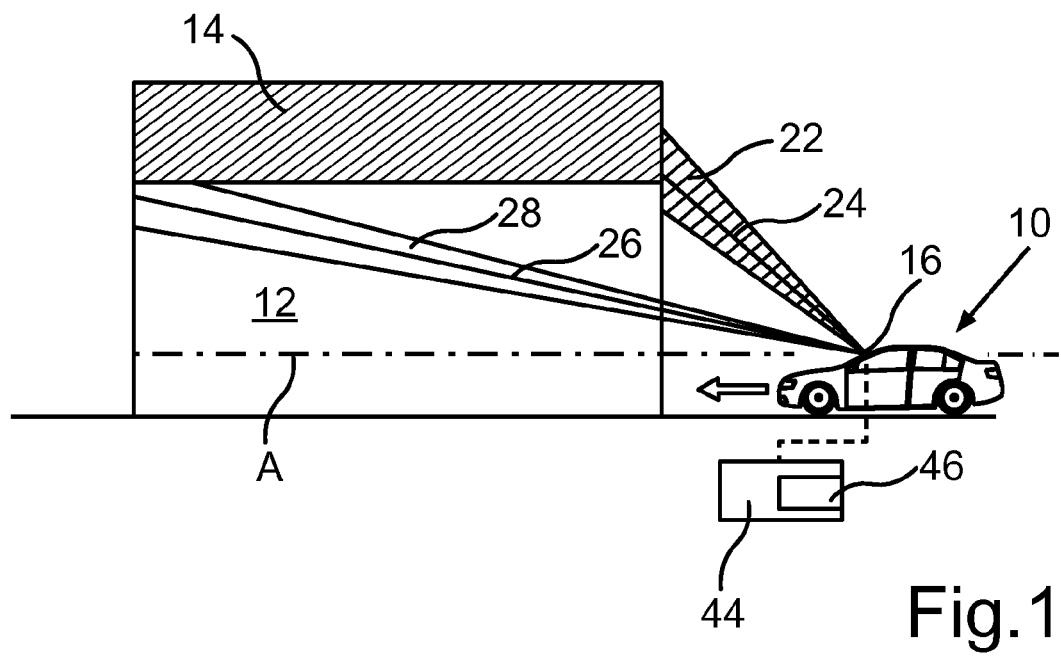

| | | | | |
|---|---|---|---|---|
| 2008/0144888 A1* | 6/2008 | Sano | ............... | G06K 9/00805 |
| | | | | 382/104 |
| 2009/0148063 A1* | 6/2009 | Hosoda | ............... | G06K 9/40 |
| | | | | 382/266 |
| 2010/0013615 A1* | 1/2010 | Hebert | ............... | B60Q 9/006 |
| | | | | 340/425.5 |
| 2011/0032221 A1* | 2/2011 | Kobayashi | ............ | G09G 5/003 |
| | | | | 345/204 |

* cited by examiner

VEHICLE AND METHOD FOR OPERATING A CAMERA ARRANGEMENT FOR A VEHICLE

The invention relates to a vehicle with at least one camera, by means of which at least one image area of an area surrounding the vehicle is capturable, wherein the image area comprises a plurality of pixels. The image area is arranged in front of the vehicle. The vehicle also comprises a tunnel detection device designed for determining an average brightness of the at least one image area. Moreover, the invention relates to a method for operating a camera arrangement for a vehicle.

US 2006/0159309 A1 describes a vehicle with a camera, which captures two image areas. A first image area is arranged obliquely above a vehicle front as viewed in the direction of travel of the vehicle. In other words a main axis of a detection area of the camera, in which detection area the upper image area comes to be positioned, is arranged inclined relative to a longitudinal axis indicating the direction of travel. By means of the camera a second image area, which is arranged in front of the vehicle as viewed in the direction of travel of the vehicle, is captured. Of both image areas an average brightness is determined. If the average brightness of the obliquely upper image area is below a threshold value, i.e. if the obliquely upper image area is relatively dark, the difference in average brightness between of the two image areas is determined. If the value of the difference is below a threshold value, a tunnel detection device draws the conclusion that a tunnel is present. If the value of the difference is greater than or equal to the threshold value, a structure arranged in the obliquely upper image area is rated as bridge. Tunnel detection may also be based upon light sources mounted in the tunnel. For this purpose, if the brightness of the obliquely upper image area is below a threshold value of brightness, the number and size of particularly bright areas within this image area are determined. If the number and size of the particularly bright areas in this image area are larger than or equal to a threshold value, it is concluded that these bright areas are light sources mounted in the tunnel.

The automatic tunnel detection by a camera is employed in the vehicle for actuating functional units of the vehicle as required. For instance the headlights may be switched on, as soon as a tunnel comes within the detection area of the camera.

In a vehicle known from the prior art at times erroneous tunnel detection occurs, because an image area of relatively low average brightness is misinterpreted as being indicative of the presence of a tunnel.

It is therefore the task of the present invention to provide a vehicle and a method of the afore-mentioned kind which allow for an improved tunnel detection.

This task is solved by a vehicle having the features of patent claim 1 and a method having the features of patent claim 12. Advantageous embodiments with convenient further developments of the invention are indicated in the dependent claims.

The vehicle according to the invention comprises at least one camera, by means of which at least one image area comprising a plurality of pixels is capturable. The image area is arranged in front of the vehicle possibly but not necessarily obliquely above a vehicle front as viewed in the direction of travel of the vehicle. Accordingly, a main axis of a detection area of the camera can be arranged slightly inclined obliquely upward relative to the horizontal direction. A tunnel detection device designed for determining an average brightness of the at least one image area herein comprises a feature detection device, by means of which differences in the brightness of pixels differing from each other within the at least one image area are identifiable. The features are characterized by abrupt changes in brightness. The features can be edges with edge detection consisting on finding transitions corresponding to abrupt changes in spatial domain. This can be achieved by finding extreme in the image using derivatives or by masks convolution. Alternately, the features corresponding to contrasts in the image are detected by analysing high frequencies in temporal domain. This is achieved by applying a high pass filter on the image to highlight abrupt changes in brightness.

The abrupt change in brightness at a transition between regions of uniform brightness in the image area is detected by way of comparison of a difference in brightness of pixels differing from each other with a threshold value. When the difference in brightness exceeds the threshold value the change in brightness is rated as an abrupt change in brightness. This leads to marking the transition between the regions of uniform brightness as a detected feature or an edge.

Utilizing the feature detection device is based on the insight that an image area can be erroneously interpreted as representing a tunnel, if merely considering its average brightness. For instance trees by the road side may shade a major part of the image area arranged obliquely above the vehicle front, i.e. render it relatively dark, so that the few bright patches in the image area do not raise the average brightness value sufficiently. A similar case may occur if facades of houses or other obstacles coming within the image area shade its major part. If within such relatively dark image areas the features are captured, i.e. lines which demarcate regions of uniform brightness within the image against each other, the lacking uniformity of the image area can be detected and considered for tunnel detection. This is owing to very abrupt changes in the brightness at the features or edges. As soon the image area is shaded due to other causes than a tunnel ceiling, there is a relative large number of such abrupt changes in brightness. As the vehicle approaches the entrance of the tunnel, the detection area of the camera within which the image area comes to be positioned, changes, too. When the obliquely upper image area comes to be positioned at the tunnel entrance itself or at the tunnel ceiling the number of abrupt changes in brightness decreases as the image area is more homogeneous and uniform.

As mentioned above a large number of abrupt changes in brightness may be present in the image area, if branches of trees, buildings, walls or other obstacles darken a major part of the image area and thus lead to a relatively low average brightness within the image area arranged usually obliquely above the vehicle front. The presence of a large number of changes in brightness, which can be identified on the basis of the detected features, consequently may be used for rating the captured image area as not belonging to a tunnel. By way of such enhanced tunnel detection, it is possible to prevent an actuating of the functional units of the vehicle, such as lighting the headlights, where it is not appropriate in view of the driving situation.

The setting of the image areas to be captured by the camera can be performed by a control unit. Such control unit may also be designed to fix the size of the corresponding image area and, in particular in case of two image areas being arranged one above the other, to set the distance between the two image areas.

Thus, in the vehicle a camera arrangement is used which comprises at least one camera, wherein by means of the camera, upon arrangement thereof within the vehicle, an image area comprising a plurality of pixels is capturable, the image area being arranged obliquely above a vehicle front as viewed in the direction of travel of the vehicle. Further, the camera arrangement intended for use within the vehicle comprises a tunnel detection device designed for determining an average brightness of the at least one image area. The tunnel detection device comprises a device for feature detection by means of which differences in the brightness of pixels differing from each other in the at least one image area are capturable and thus features are detectable. The device for feature detection or the tunnel detection device may be provided by a computing device such as a microprocessor, which in particular can be integrated within the camera. The microprocessor, however, may also be a separate unit in the vehicle. Such a microprocessor may be coupled to the camera and may serve in particular for actuating functional units of the vehicle, for instance for lighting the headlights.

Preferably, the tunnel detection device is designed for determining a ratio of the pixels assigned to the detected features within the at least one image area in relation to the total number of pixels within the at least one image area. Such ratio is particularly simple to be processed with the aid of a computing device in the course of the tunnel detection.

In this connection it has proven to be advantageous to deposit a threshold value for the ratio in the tunnel detection device, the threshold value allowing for a conclusion as to the presence of the tunnel. A comparison of the ratio with the threshold value is performed particularly easily and quickly. It has turned out that only in case of a relatively large uniformity of brightness within the at least one image area a correct tunnel detection is given. The threshold value therefore may be less than 5%. Particularly reliable results in tunnel detection are obtained when setting the threshold value to about 2%. In other words, more than 95% of the image area—or in particular more than 98% of the image area—are free of features, wherein the features are detected due to adjacent pixels of strongly different brightness.

In a further advantageous embodiment of the invention by means of the at least one camera a second image area arranged below the first image area in front of the vehicle is capturable. By means of the tunnel detection device an average brightness of the second image area is determinable. This is based on the insight that the determining of the average brightness in two separate image areas raises the reliability of tunnel detection. If namely in both image areas a low average brightness is determined, there is a raised likelihood that the presence of a tunnel is correctly assumed.

Moreover, the second image area arranged below the first image area allows for distinguishing a bridge traversing the road on which the vehicle travels from a tunnel. In the case of a bridge the lower, second image area namely can capture the light behind the bridge, whilst the bridge itself still darkens the first image area. Also the vehicle's approaching an end of the tunnel can be captured in this way, since the lower, second image area increasingly comes within the region illuminated by light from beyond the tunnel of the vehicle's surroundings as the vehicle approaches the end of the tunnel. The capturing of the first upper image area and the second image area in particular allows for distinguishing a short tunnel or an underground crossing or a bridge traversing the road from a long tunnel, which in any case will render it necessary to switch on the headlights of the vehicle.

When capturing two image areas it has proven to be advantageous if the first image area is larger than the second image area. For a correct tunnel detection it is advantageous, if the first image area possibly corresponding to angle of view arranged obliquely relative to the direction of travel of the vehicle is relatively large. By capturing a large upper area it is avoided that a single object shading the front screen area of the vehicle causes the tunnel detection device to conclude that a tunnel is present. In particular the first image area can extend across the entire front screen of the vehicle.

The second image area, which may in particular serve for a verification or confirmation of the presence of a tunnel, however, may be selected to be considerably smaller than the first image area. In particular the surface of the second image area may amount to less than 10%, preferable less than 5%, even less than 2% of the surface of the first image area. In the case of such a comparatively small second image area the average brightness can be determined particularly quickly.

It is further preferred if a distance is pre-determinable between the first image area and the second image area arranged below the first image area. By way of setting the distance between the two image areas it namely can be fixed whether an object captured by the camera is to be interpreted as tunnel or bridge. In the case of the set distance between the two image areas being small, already a relatively short cover over the road on which the vehicle travels is categorized as a tunnel. If the set distance between the two image areas is larger, however, only a relatively long cover over the road as viewed in the direction of travel of the vehicle is interpreted as being a tunnel and not a bridge. Pre-determinability of the distance between the two image area renders a raised flexibility in filtering out bridges from tunnels within the objects captured by the camera.

In this connection it has turned out to be an advantage if a height and/or a width of the second image area is/are variable in dependence on the set distance. Namely, if the second image area is meant to capture the tunnel exit whilst a large distance of the two image areas is given, it is reasonable to pre-determine the width of a road lane at this distance from the camera as width of the second image area. This is because the width of a road lane provides a minimum opening width of a tunnel. The height of the second image area may equally as well be selected to be smaller if a larger distance between the two image areas is given. When approaching the tunnel exit with the vehicle, the tunnel exit comes to be positioned within the second image area. In case of a large distance between the two image areas the tunnel exit capturable by the camera at a greater distance from the camera, is less wide than in the case of a smaller set distance between the two image areas. Therefore by adapting the height and the width of the second image area the apparent size of the tunnel exit at a certain distance from the camera can be taken into account, thus allowing reliable tunnel detection and reliable filtering of bridges.

In a further advantageous embodiment of the invention the tunnel detection device is designed to draw a conclusion as to the presence of a tunnel on the basis of the features detected within the first image area. This is because it suffices to take into consideration the pixels assigned to the features detected in only one image area to determine uniformity of the distribution of brightness, or lack thereof, within this image area. This allows for a particularly quick and reliable tunnel detection. Feature detection in the first, upper image area is particularly useful for tunnel detection as the tunnel entry comes to be positioned in this image area as the vehicle approaches the tunnel entry.

In a further advantageous embodiment of the invention a height of the at least one image area above the road surface in dependence on an inclination of the vehicle is settable. If the longitudinal axis of the vehicle is inclined relative to the horizontal, this also has bearings on the at least one image area which is capturable by the camera. In the case of an inclination of the vehicle in which the rear of the vehicle is higher than the front of the vehicle, accordingly the image area arranged above the front of the vehicle as viewed in the direction of travel of the vehicle comes to be positioned further in front of the vehicle than in the case of the vehicle being evenly adjusted. As a result it may occur that the image area suitable for tunnel detection is not captured.

Upon capturing two image areas arranged one above the other by means of the camera, in particular the lower, second image area is affected by the inclination of the vehicle relative to the horizontal. In this case the inclination of the vehicle towards the front may cause a structure, which actually would correctly be categorized as a tunnel, to be incorrectly categorized as a bridge. Vice versa in the case of an inclination of the vehicle which involves a position of the vehicle's front being higher than that of the vehicle's rear, the lower, second image area may not—as originally intended—capture the exit of the tunnel but a portion of the tunnel ceiling positioned before the tunnel exit. This means that adjusting the height of the at least one image area above the road surface in dependence on the inclination of the vehicle allows for a particularly precise distinguishing of tunnels from bridges. Moreover, this ensures that image areas relevant to tunnel detection are actually captured, even if the vehicle has an inclination relative to the road surface.

Further advantageous is the provision of at least one blur device. The blurring, in particular the blurring of a captured image, reduces noise and thus improves the results of the subsequent edge detection. For blurring a median filter, a Gaussian blur, or a bilateral filter may be used, as the named blurring techniques particularly effectively suppress noise and thus preserve the presence of possibly existing features or edges in the image.

Finally, it is an advantage if the camera is designed for capturing an electromagnetic radiation in the range visible to the human eye and for capturing infrared radiation. This allows for identifying the kind of the external light source serving for the brightness in the image area captured by the camera. For instance in this way it can be determined whether the external light source is sunlight or the light of a street lighting. Particularly simply, an optical infrared filter, which is commonly provided on a camera for a vehicle, can be done without, so that the camera can also capture infrared radiation.

In the method for operating a camera arrangement of a vehicle according to the invention by means of at least one camera at least one image area comprising a plurality of pixels is captured, the image area of a surrounding of the vehicle corresponding to angles of view arranged obliquely above a vehicle front as viewed in the direction of travel of the vehicle. An average brightness of the at least one image area is determined. By means of a device for feature detection differences in the brightness of pixels differing from each other in the at least one image area are captured and thus possibly existing features are detected. The features in the image area provide information as to whether objects cause the image area to have a relatively large number of abrupt changes in brightness and thus does not represent a tunnel but an area surrounding the vehicle which is different from a tunnel.

In an advantageous embodiment a ratio of pixels assigned to the detected features in relation to the total number of pixels in the at least one image area is determined, and in dependence on the ratio a conclusion is drawn as to the presence of a tunnel. Such computing operation allows for integrating algorithms into the tunnel detection to a large extent.

Preferably, by means of the at least one camera a second image area arranged below the first image area and at least partially arranged above the vehicle front as viewed in the direction of travel of the vehicle is captured, wherein an average brightness of the second image area is determined. The determining of such second image area allows for a verification of the tunnel detection. If namely also in the second image area a comparatively low average brightness is given, there is a particularly strong likelihood that both image areas capture a tunnel ceiling. Moreover, through capturing the lower, second image area a tunnel can be distinguished from a bridge, and a tunnel exit can be captured particularly early and thus the actuating of functional units of the vehicle, in particular the switching off of the headlights, can be effected.

Finally, it has turned out to be an advantage if on the basis of the features detected in the first image area it is concluded that a tunnel is present. By way of performing feature detection merely in the first image area, which is most relevant to the tunnel detection, the enhanced method for tunnel detection can be performed particularly quickly and by means of a relatively simple and low-cost computing device.

The preferred embodiments presented with respect to the vehicle according to the invention and the advantages thereof correspondingly apply to the method according to the invention and vice versa.

All of the features and feature combinations mentioned in the description above as well the features and feature combinations mentioned below in the description of the figures and/or shown in the figures alone are usable not only in the respectively specified combination, but also in other combinations or else alone without departing from the scope of the invention.

Figure 2:
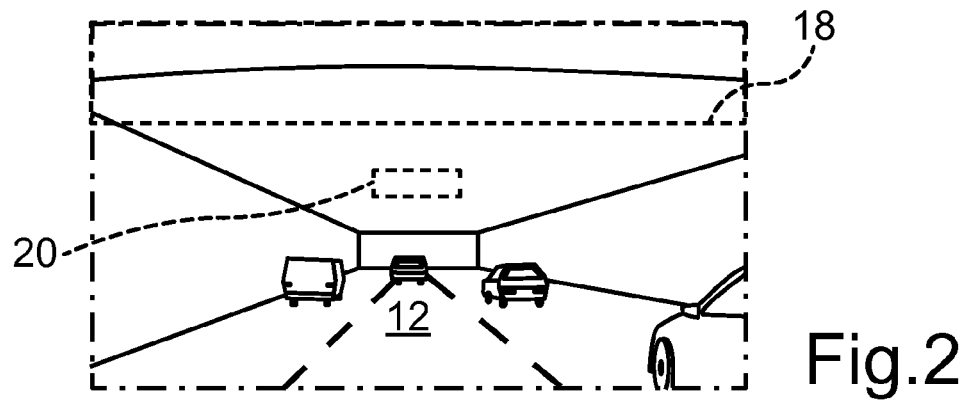
Figure 3:
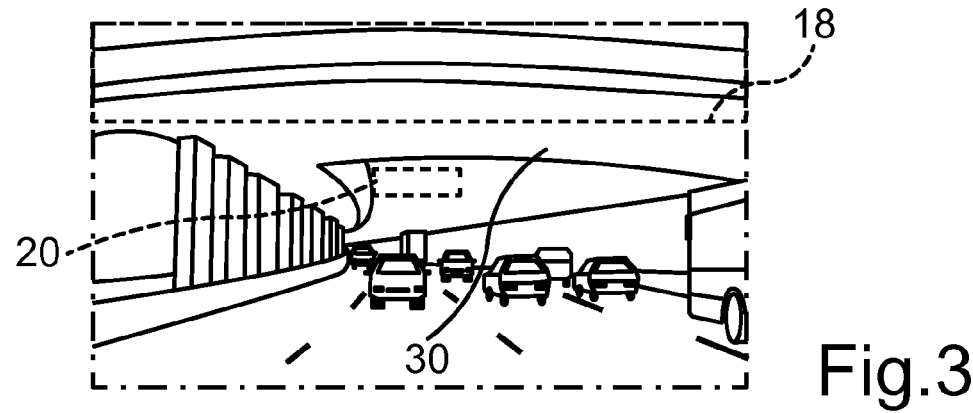
Figure 4:
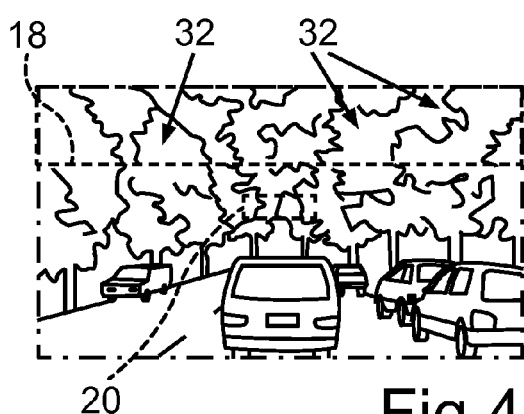
Figure 5:
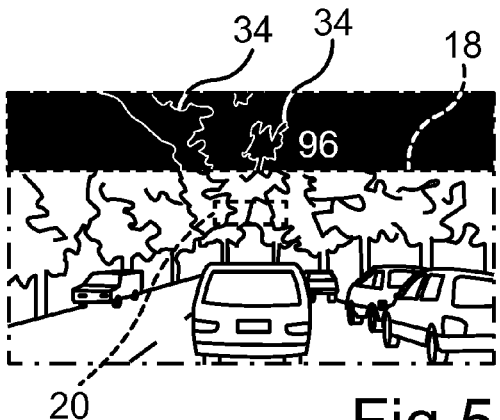
Figure 6:
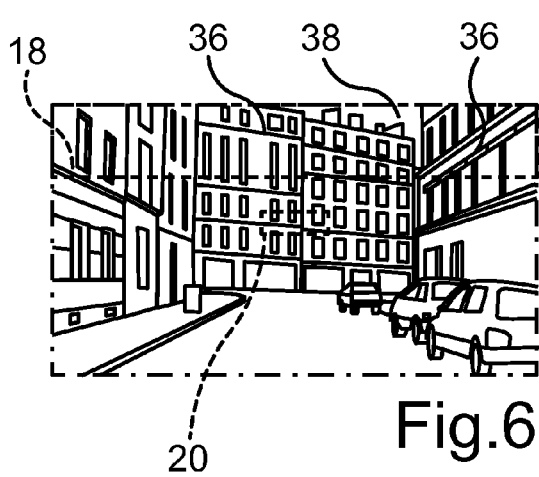
Figure 7:
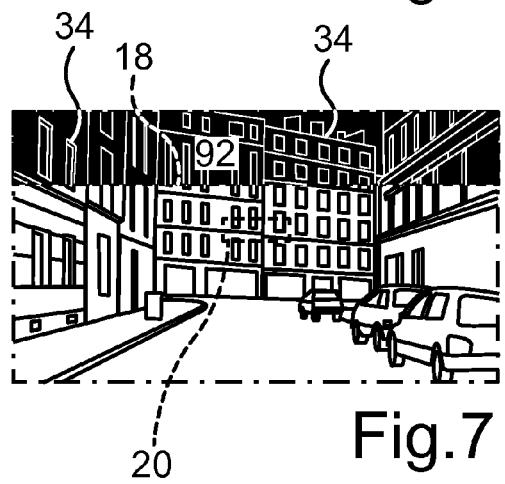
Figure 8:
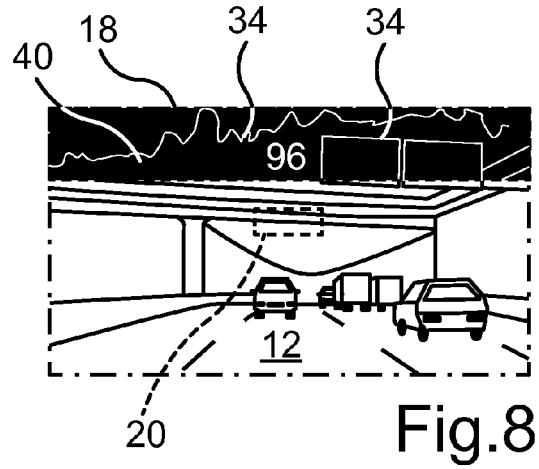
Figure 9:
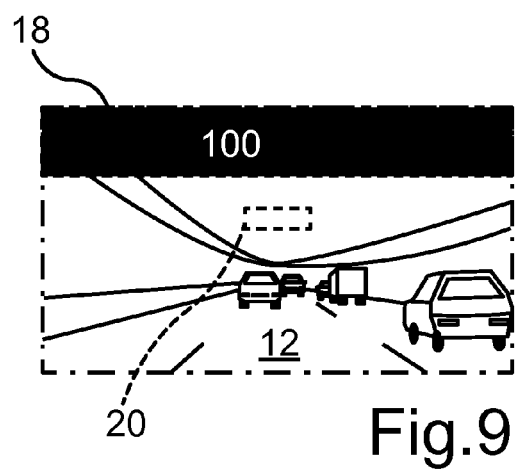
Figure 10:
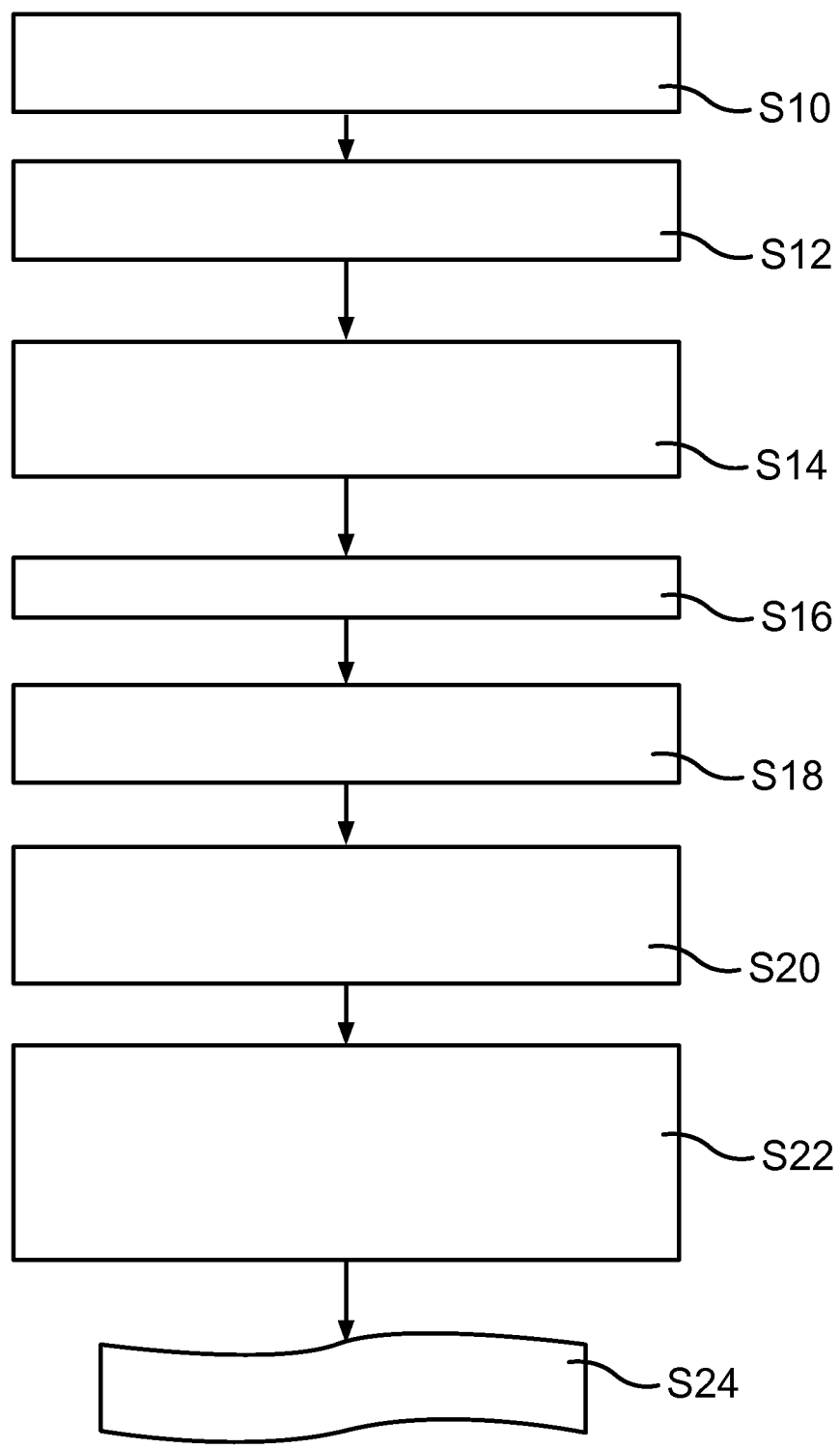
Figure 11:
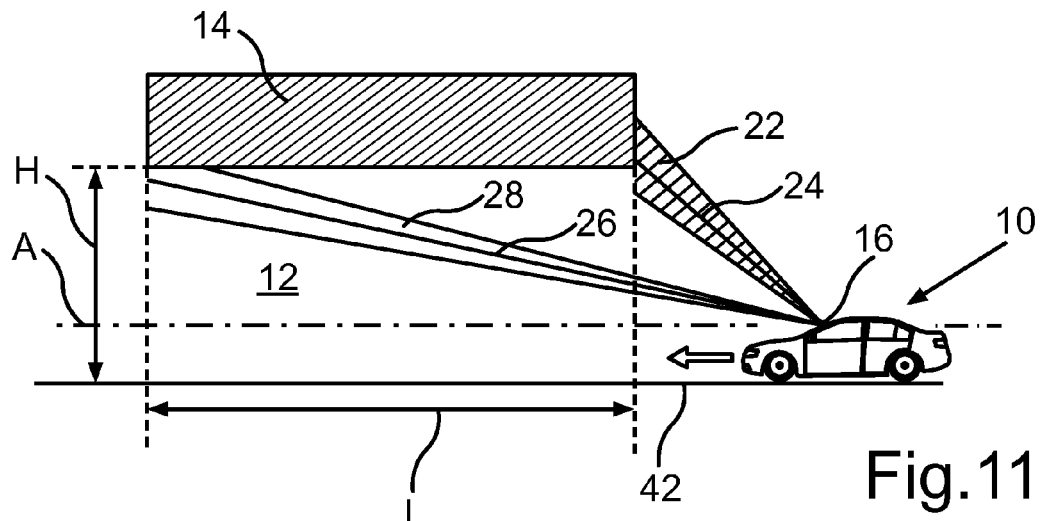
Figure 12:
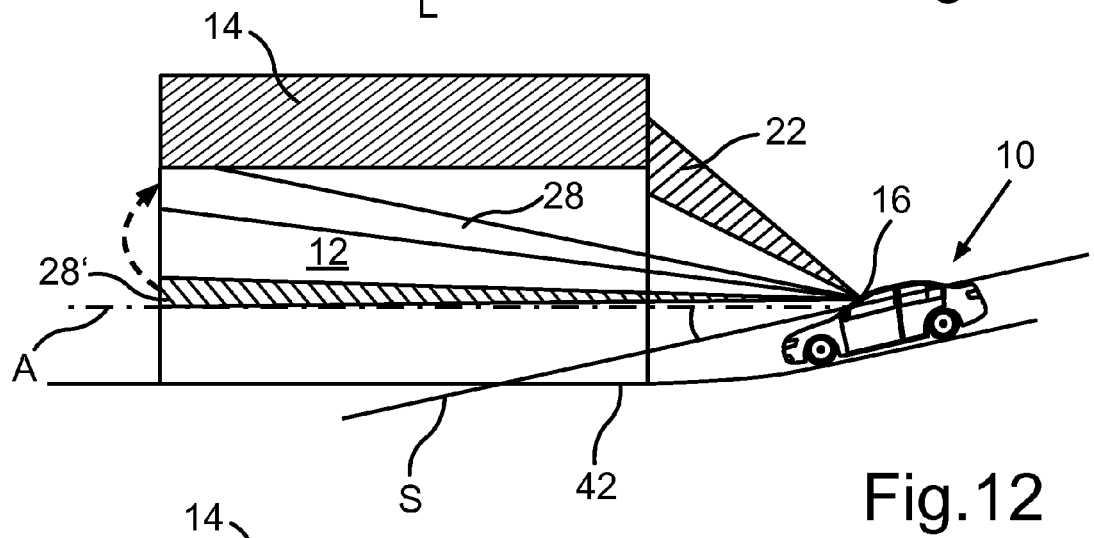
Figure 13:
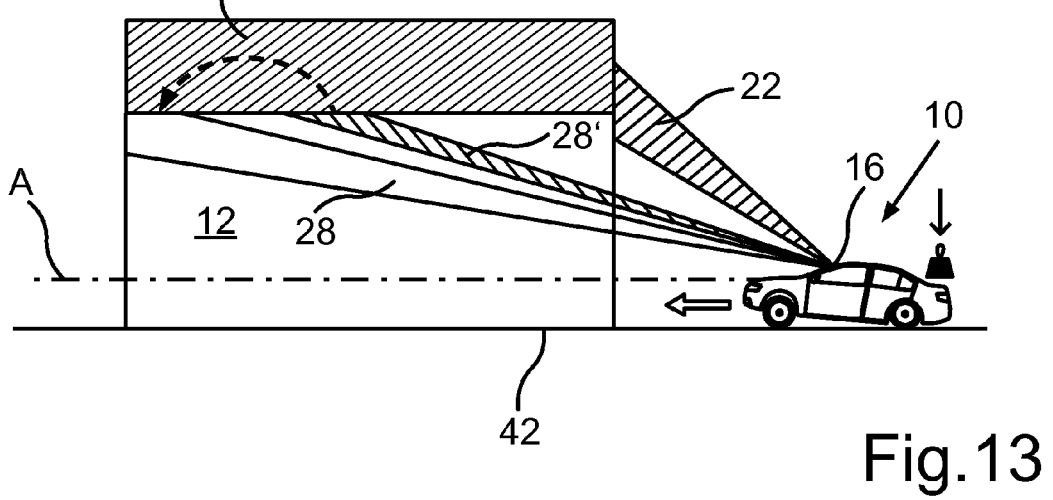
Figure 14:
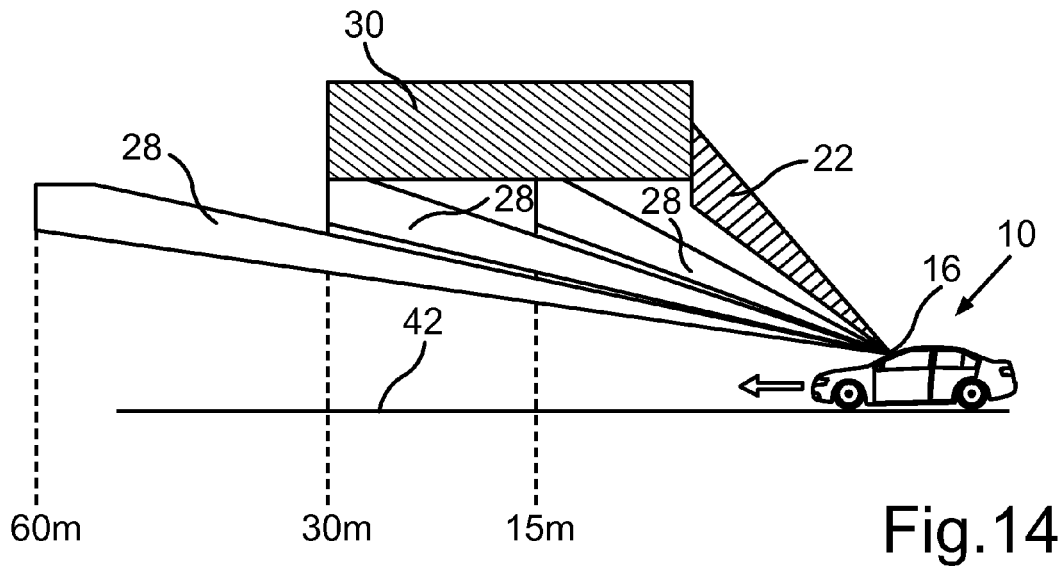
Figure 15:
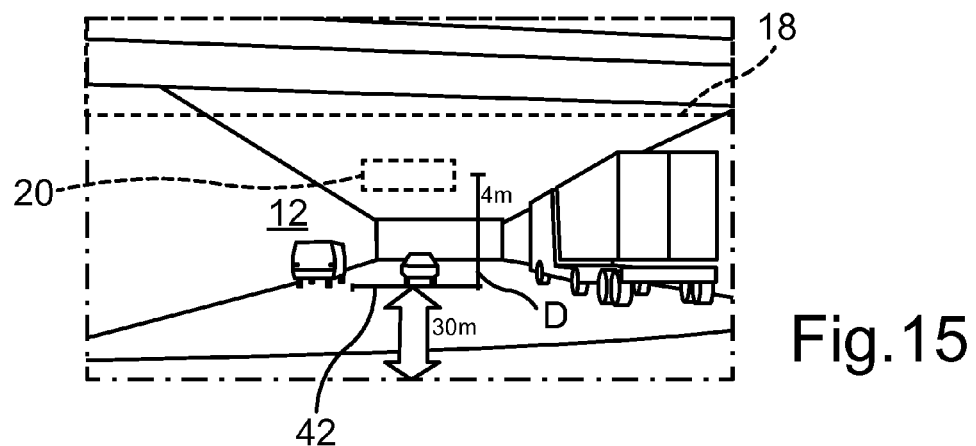
Figure 16:
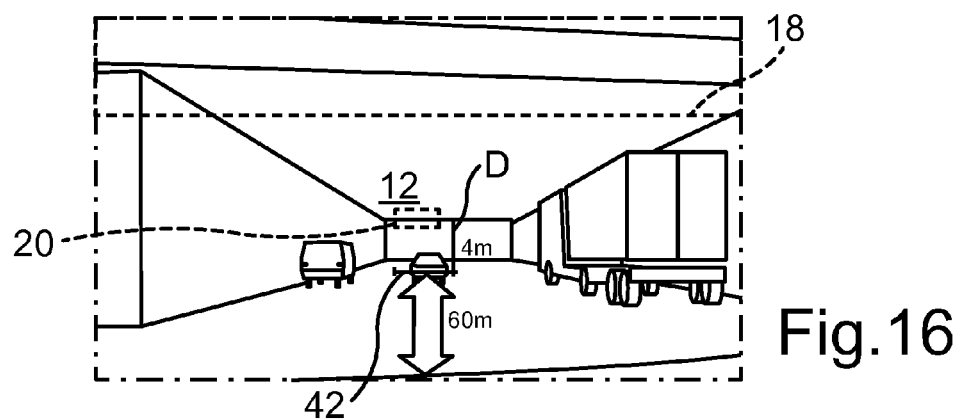
Figure 17:
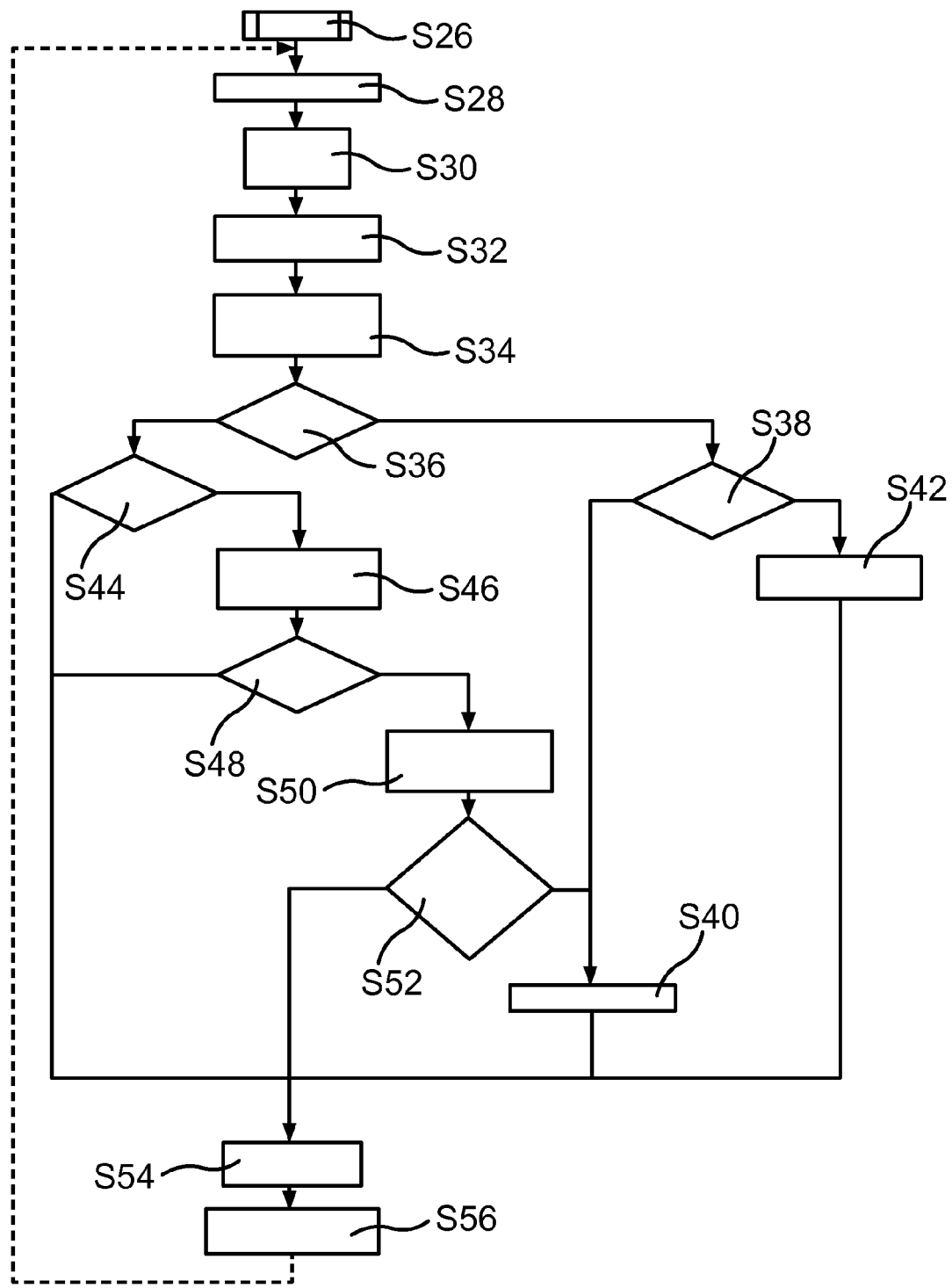

Further advantages, features and details of the invention are apparent from the claims, the following description of preferred embodiments as well as from the drawings. Therein show in:

FIG. 1 a schematic lateral view of a vehicle positioned in front of a tunnel, the vehicle having a camera, which captures two image areas of an area surrounding the vehicle, wherein the detection areas of the camera assigned to the corresponding image areas have main axes inclined relative to the direction of travel of the vehicle;

FIG. 2 a driving situation with a frontal view of the tunnel entrance with the two image areas arranged one on top of the other, which are captured by the camera;

FIG. 3 a driving situation in which the camera in the upper image area captures part of a bridge and in the lower image area captures parts of the surroundings behind the bridge;

FIG. 4 a driving situation in which trees darken a major part of the two image areas;

FIG. 5 the image areas according to FIG. 4, wherein features shown within the upper image area indicate the occurrence of abrupt changes in brightness within the upper image area;

FIG. 6 a driving situation in which a major part of the upper image area is occupied by buildings;

FIG. 7 the image areas according to FIG. 6, wherein lines of abrupt changes in brightness within the image area are indicated by edges;

FIG. 8 a driving situation in which the vehicle approaches a tunnel, wherein in the upper image area transitions between regions of differing brightness are marked as edges;

FIG. 9 a driving situation in which the vehicle enters the tunnel of FIG. 8, wherein the upper image area is free of marked features;

FIG. 10 a flow diagram showing the processing steps performed in the course of feature detection;

FIG. 11 a schematic lateral view of the vehicle positioned in front of the entrance of a tunnel, the vehicle having no inclination relative to the road surface;

FIG. 12 the vehicle according to FIG. 11, however, with lowered vehicle front and accordingly corrected adjustment of the detection area for capturing the lower image area;

FIG. 13 the vehicle according to FIG. 11, however, with lowered vehicle rear and accordingly corrected adjustment of the detection area for capturing the lower image area;

FIG. 14 a lateral view of the vehicle positioned in front of a bridge with different settings of the two detection areas defining the upper and the lower image areas;

FIG. 15 a frontal view of a tunnel with a first arrangement of the two image areas relative to each other;

FIG. 16 the tunnel of FIG. 15 with a second arrangement of the two image areas relative to each other and an adjusted size of the second, lower image area; and FIG. 17 a flow diagram describing the process of tunnel detection.

FIG. 1 in a schematic lateral view shows a vehicle 10, which is positioned in front of a tunnel 12 of which a tunnel ceiling 14 is shown. In the upper part of a front screen of the vehicle 10 a camera 16 is arranged, which captures two separate image areas 18, 20 of the surroundings of the vehicle 10. The two image areas 18, 20 (see FIG. 2) correspond to angle of view arranged obliquely relative to the direction of travel of the vehicle 10, indicated in FIG. 1 by an arrow.

A detection area 22 of the camera 16, in which comes to be positioned the first image area 18, is shown in FIG. 1 in a schematic lateral view. A main axis 24 of this detection area 22 is inclined relative to the direction of travel of the vehicle 10, which is indicated by an axis A, and forms an acute angle. In analogy a main axis 26 of a detection area 28 of the camera 16, in which comes to be positioned the second image area 20, is inclined relative to the axis A, but here the main axis 26 forms a smaller angle with the axis A than does the main axis 24.

Both image areas 18, 20 capturable by means of the camera 16 with an angle of view arranged obliquely relative to the axis A such that there is a distance between the image areas 18, 20 in the vertical direction. The camera 16 is coupled to a computing device 44 arranged within the vehicle 10, the computing device 44 being designed for tunnel detection. For this purpose the computing device 44 includes a device 46 for feature detection. The feature detection device 46 is capable of detecting features or edges in the image areas 18, 20 captured by the camera 16. These features are characterized by abrupt changes in brightness within the image areas 18, 20. The computing device 44 can alternatively be included in the camera 16.

As may be gathered from FIG. 2, if the vehicle 10 as shown in FIG. 1 is positioned at a short distance in front of the tunnel 12, the upper image area 18 assigned to the first detection area 22 captures part of the tunnel ceiling 14 at the entrance of the tunnel 12. The lower image area 20 assigned to the second detection area 28 captures a portion of the tunnel ceiling 14 which is inside the tunnel 12. The upper, large image area 18 in this set-up captures the tunnel entrance across its entire width, whilst the second image area 20 is considerably smaller and merely occupies 5% of the first image area 18.

In order to automatically switch on the headlights of the vehicle 10 when entering the tunnel 12, the average brightness of both image areas 18, 20 is determined. The brightness can here be indicated as average greyscale value of the various greyscale values of the individual pixels of the respective image area 18, 20. If a colour image camera is used, the colour shades and brightness values of the individual pixels can be transformed into corresponding greyscale values for this purpose.

If both the upper, large image area 18 and the central, lower image area 20 each have a low average brightness, it can be concluded that a tunnel 12 is present within the capture range of the camera 16. For this purpose the respective average brightness values are compared to a threshold value.

In the driving situation of the vehicle 10 shown in FIG. 3 the upper image area 18 comes to be positioned within the area of a bridge 30, whilst the lower image area 20 already captures the daylight beyond the bridge 30. In such a case the average brightness value of the upper image area 18 may be smaller than the threshold value fixed for the detection of a tunnel 12, but the average brightness value of the second image area 20 is larger than this threshold value. Accordingly, the structure is not categorized as tunnel 12 but as bridge 30. In the present case beyond the determination of the brightness values of the two image areas 18, 20 as a further image processing step edge detection is performed by the edge detection device 46, in order to avoid an erroneous tunnel detection.

FIG. 4 shows a driving situation, in which in the upper image area 18 trees 32 are shown as examples of obstacles which darken the surroundings of the vehicle 10 and thus the upper image area 18. Also the lower, smaller image area 20 has a comparatively low average brightness, as this area, too, is shaded by branches of the trees 32. This means that here the mere consideration of the average brightness of the two image areas 18, could lead to the erroneous detection of a tunnel and thus cause the unnecessary switching on of the headlights of the vehicle 10. In the present case, though, within the upper image area 18 abrupt changes in the brightness are detected and transitions between regions of different brightness in the image area 18 are marked as features 34. For the feature detection, carried out by the feature detection device 46, various operators can be employed. For instance the feature or edge detection can be effected by means of the Canny algorithm.

FIG. 5 shows the image area 18 with the detected features 34 marked therein. In the image area 18 which, as is shown in FIG. 4, is strongly shaded by objects, at the transitions of these shading objects—in the present case trees 32—to bright areas like the sky behind the trees 32 a particularly large number of edges 34 are detected.

In order to quantify the features 34, the pixels assigned to the features 34 are summed up and put in relation to the pixels considered during feature detection, i.e. the total number of pixels present in the image area 18. This operation is also performed by the feature detection device 46. If there is a large number of features 34 present in the image area 18, it is to be assumed that the low brightness of the image area 18 is due to a shading caused by objects like the trees 32 and not due to the circumstance of the vehicle 10 approaching a tunnel 12. Consequently by way of an analysis of the features 34 within the image area 18, an erroneous tunnel detection can be avoided.

In the example shown in FIG. 5 for instance the fraction of pixels of the image area 18 which are not assigned to edges 34 may amount to 96%. If as threshold a value of 98% is set, the feature detection within the image area 18 leads to the correct conclusion that in the driving situation shown in FIG. 4 no tunnel is present.

In the driving situation shown in FIG. 6 the low brightness of the image area 18 is caused by buildings 36 in the image area 18. Between and above the buildings 36 there is merely one bright area 38 within which a section of the sky comes to be positioned.

Here, too, the detection of features 34 shown in FIG. 7 causes a demarcation of regions of different brightness, wherein the regions themselves are rather uniform in brightness. For instance the area 38, in which a section of the sky can be seen, is delimited by a feature 34. Equally, structures and/or windows provided on facades of the buildings 36 lead to the marking of features 34 in the image area 18. In the example shown in FIG. 7 the detection of the features 34 may lead to a value of 92% of pixels which are not assigned to the features 34. Consequently, this image area 18 is not misinterpreted as the entrance of a tunnel 12, if the threshold value is set to be 98%.

FIG. 8 shows a driving situation in which the vehicle 10 approaches a tunnel 12, but is still at some distance from its entrance. In this example, structures 40 above the tunnel ceiling lead to the situation that in the upper image area 18 a relatively large number of features 34 is detected. For instance the fraction of pixels which are assigned to the features 34 can amount to 4% of the total number of pixels present in the image area 18, so that for a threshold value of 2% for the maximum allowed number of pixels assigned to features 34 the structure correctly is not interpreted as a tunnel.

In the driving situation shown in FIG. 9 the vehicle is so close to the tunnel 12 that there is not only a low average brightness value given for the image area 18 but also no longer any features are detected within the upper image area 18. This means that no pixel of the image area 18 is assigned to a feature. Accordingly, here the presence of a tunnel 12 is correctly assumed and upon entering the tunnel 12 the headlights of the vehicle 10 are switched on. The feature detection may additionally or alternatively be performed in the second, lower image area 20.

FIG. 10 serves for showing the steps performed in feature detection by the feature detection device 46. In a first step S10 an image is captured for feature detection therein, for instance the image area 18. Alternatively, only a section of the image area 18 may be subjected to subsequent feature detection. In a step S12 the image area 18 is blurred for the purpose of suppressing noise. Gaussian blur, median blur, or bilateral filtering can be used to remove noise in order to improve the results of later feature detection. Median filtering for example particularly well preserves features while removing noise.

In a further step S14 by means of an algorithm feature detection is performed. In a following step S16 an output image is generated in which the features 34 are marked. Subsequently, in a step S18 the number of pixels is determined which are assigned to the detected features 34. In a step S20 the number of the pixels assigned to the detected features 34 is divided by the total number of pixels processed in feature detection of the image area 18.

In a further step S22 a comparison is made as to whether the ratio determined in step S20 is smaller than or equal to a threshold value. For instance the ratio determined in step S20 can be deducted from the number 1. If 5% of all pixels in the image area 18 are assigned to the detected features 34, in a calculation example in step S20 a ratio of 0.05 is deducted from the number 1. Accordingly, a value of 0.95 is rendered. For comparison of that value with the threshold value, which for instance may amount to 95%, the numerical value 95 (corresponding to the threshold value of 95%) may be deducted from the number 1 and the result be divided by −100. Accordingly, a value of 0.94 is rendered. As the previously determined value of 0.95 is larger than this value of 0.94, the comparison in step S22 renders that in the image area 18 there are too many pixels assigned to features 34. Consequently, the image area 18 is not interpreted as representing a tunnel 12 or a bridge 30 (see step S24) despite the low average brightness within the image area 18.

FIG. 11 shows the vehicle 10 approaching the tunnel 12 just before it enters the tunnel 12. Taking into account the height of a pixel, which is in the range of 6 μm, a height H of the tunnel 12, which is commonly about 4 m and a length L of the tunnel 12 seen in direction of travel of the vehicle 10 it may be pre-determined whether an object is to be rated as tunnel 12 or as bridge 30.

If for instance the detected object has a length L of less than 30 m, this object is regarded as bridge 30 and not as tunnel 12. Accordingly, through setting the inclination of the main axes 24, 26 of the detection areas 22, 28 with regard to the axis A it can be pre-determined at which length L the structure through which the vehicle 10 drives is regarded as tunnel 12 or as bridge 30. In other words, the detection areas 18, 20 can be positioned vertically such that a bridge 30 with a certain length L viewed in the direction of travel of the vehicle 10 is conceived as tunnel 12.

Let us assume that the relative arrangement of the image areas 18, 20 shown in FIG. 11 is such that at a length L of the object of 30 m the object is categorized as tunnel 12. In such a configuration the inclination of the vehicle 10 may lead to the situation that the image area 20 assigned to the detection area 28 does not come to be positioned at the desired place. Presently, such deviations caused by an inclination of the vehicle 10 relative to a road surface 42 are considered.

FIG. 12 shows a case in which the vehicle 10 is inclined forward. Accordingly, a longitudinal axis S of the vehicle 10 forms an acute angle with the axis A. This angle is also called the pitch of the vehicle 10. The angle may be indicated in radian or in degree and commonly is available in a control device of the vehicle 10. The angle can be communicated to the computing device 44 for instance via a CAN bus or a LIN bus.

In the driving situation shown in FIG. 12 with an unchanged detection area 28' the camera 16 would not capture an image area at the tunnel ceiling 14, but the exit of the tunnel 12. Presently, however, the detection area 28 upon considering the inclination of the vehicle 10 is adjusted in such a way that the desired height of the second image area 20 above the road surface 42 is reached. This desired height above the road surface 42 corresponds to the one as for a vehicle 10 without any inclination (cf. FIG. 11).

The inclination of the vehicle 10 in particular has bearings on the lower detection area 28, to which the lower image area 20 is assigned. Accordingly, in dependence on the inclination of the vehicle 10 the lower image area 20 is moved as to its height above the road surface 42, i.e. in the vertical direction. In the case of a forward pitch, the lower image area 20 correspondingly is moved upward, namely in proportion to the angle formed by the longitudinal axis S of the vehicle and the axis A. Then also for an inclined vehicle 10 the distinction of a tunnel 12 from a bridge 30 as from a preset length L can be made.

FIG. 13 shows how—in the case of a loaded vehicle 10 with consequently lowered vehicle rear—a detection area 28' is set less steep to the desired detection area 28 and thus the image area 20 is correspondingly moved downward in the vertical direction. By moving the image area 20 in the vertical direction its distance from the upper imager area 18 varies.

FIG. 14 shows how different inclinations of the main axis of the detection area 28 affect the interpretation of a structure approached by the vehicle 10 as a bridge 30 or a tunnel. For instance, in the case of a relatively steep adjustment of the detection area 28 as from a length of 15 m of a structure underneath which passes the vehicle 10, this structure is interpreted as tunnel 12, and otherwise as bridge 30.

If the inclination of the detection area 28 is less steep, as shown in FIG. 14, up to a length of 30 m as viewed in the direction of travel of the vehicle 10, the structure is interpreted as bridge 30, and in the case of a greater length as tunnel 12. In the case of an even less steep inclination of the detection area 28 and an accordingly larger vertical distance between the two image areas 18, 20, only upon exceeding a length of 60 m the structure is rated as tunnel 12 and otherwise as bridge 30. In other words, by way of pre-determining the distance between the two image areas 18, 20 in the vertical direction it can be fixed as from which length L a structure is to be rated as tunnel. The length L is thus set to filter bridges 30 from tunnels 12.

FIG. 15 shows an example in which the distance between the two image areas 18, 20 is set such that in the case of a length L of more than 30 m the structure is rated as tunnel. The size of the lower image area 20 in this connection is equally made to depend on the length L pre-determined for distinguishing between a bridge 30 and a tunnel 12. The width of the second image area 20 in this connection is selected to correspond to the width of a single driving lane for the vehicle 10 and thus to the minimum opening of a tunnel 12. Moreover, the lower image area 20 is centred on the optical axis of the camera 16.

The height of the image area 20 in FIG. 15 corresponds to the height of an object of 2 m, which is positioned at a distance of 30 m in front of the camera 16. With regard to the height above the road surface 42 the image area 20 is centred with reference to a point which is at a height D of 4 m above the road surface 42, wherein this height D of 4 m is viewed at a distance of 30 m from the camera 16.

FIG. 16 shows a correspondingly smaller lower image area 20, which is spaced further apart from the upper image area 18, and which is used for distinguishing of a bridge 30 from a tunnel 12 as from a length of 60 m of the tunnel 12. Here, too, the lower image area 20 has a width, which corresponds to the width of a single driving lane for the vehicle 10, but at a distance of 60 m from the camera 16. Also the height of the image area 20 is less than that in the relative arrangement of the two image areas 18, 20 shown in FIG. 15. Furthermore, the height D of the centre of the image area 20 above the road surface 42 is the equivalent of 4 m relative to the distance from the camera 16, which amounts to 60 m in FIG. 16.

FIG. 17 represents a method for tunnel detection. After a starting step S26 in a step S28 the inclination of the vehicle 10 is determined. Accordingly, in a step S30 the image areas 18, 20 are set such that upon exceeding a pre-determined length L the structure underneath which the vehicle will pass is interpreted as tunnel 12 and not as bridge 30.

Then the camera 16 in a step S32 captures images according to image areas 18, 20. In a next step S34 the average brightness is determined in the upper image area 18. If the vehicle 10 is already in a tunnel (step S36), in a step S38 it is checked whether the average brightness in the image area 18 is above a pre-determined threshold value. If this is not the case, it is concluded that the vehicle 10 is still in the tunnel 12 (step S40). If the average brightness value in the image area 18 exceeds the threshold value, in a step S42 it is concluded that an exit of the tunnel 12 comes to be positioned within the image area 18 and thus an end of the tunnel 12 will be reached soon. Upon reaching the exit of the tunnel 12 the headlights of the vehicle 10 are switched off again.

If the vehicle is not yet in the tunnel, it is checked in a step S44 whether the average brightness in the upper image area 18 is below the pre-determined threshold value. If this is the case, in a step S46 the average brightness in the second image area 20 is determined. Subsequently, in a step S48 it is checked whether also in this lower image area 20 the average brightness is below the pre-determined threshold value. If this is the case, in a step S50 an edge detection in the image area 18 is performed.

Thereafter, in a step S52 it is checked whether the image area 18 is largely uniform and homogeneous, or else contains a large number of edges 34. This means it is checked how many pixels are assigned to the edges 34 detected in step S50. If step S52 renders that the image area 18 is largely devoid of edges 34 and thus relatively uniform and homogeneous, it is concluded that a tunnel is present (step S40). If step S52 renders that the image area 18 is inhomogeneous, i.e. that too many abrupt changes in brightness are contained therein, a conclusion that a tunnel is present is prevented from being drawn.

However, if the image area 18 is inhomogeneous and has a large number of edges 34, in a next step S54 the driving speed of the vehicle 10 is detected. This allows for navigation data of the vehicle 10 to be updated in a step S56, subsequent to which it is returned to step S28.

The invention claimed is:

1. A vehicle comprising:
    at least one camera for capturing at least one image area of a surrounding of the vehicle, the image area comprising a plurality of pixels and being arranged in front of the vehicle; and
    a tunnel detection device for determining an average brightness of the at least one image area, wherein the tunnel detection device comprises a device for feature detection, by means of which differences in the brightness of pixels differing from each other are capturable and thus features characterized by abrupt changes in brightness are detectable in the at least one image area, wherein a height of the at least one image area above the road surface is adjustable in dependence on an inclination of the vehicle.

2. The vehicle according to claim 1, wherein the tunnel detection device is designed for determining a ratio of the pixels assigned to the detected features in the at least one image area in relation to the total number of pixels in the at least one image area.

3. The vehicle according to claim 2, wherein a threshold value for the ratio is deposited in the tunnel detection device, which in particular amounts to less than 5%, allowing for a conclusion as to the presence of a tunnel.

4. The vehicle according to claim 1, wherein the at least one camera a second image area arranged below the first image area in front of the vehicle is capturable, wherein by the tunnel detection device an average brightness of the second image area is determinable.

5. The vehicle according to claim 4, wherein the first image area is larger than the second image area.

6. The vehicle according to claim 4, wherein a distance between the first image area and the second image area arranged below same is pre-determinable.

7. The vehicle according to claim 6, wherein a height and/or a width of the second image area is variable in dependence on the set distance.

8. The vehicle according to claim 4, wherein the tunnel detection device is designed to allow for a conclusion as to the presence of a tunnel on the basis of the features detected in the first image area.

9. The vehicle according to claim 1, further comprising at least one blur device for blurring a captured image.

10. The vehicle according to claim 1, wherein the at least one camera is for capturing an electromagnetic radiation in the range visible to the human eye and for capturing infrared radiation.

11. The vehicle according to claim 1, wherein a threshold value for the ratio is deposited in the tunnel detection device, which in particular amounts to about 2%, allowing for a conclusion as to the presence of a tunnel.

12. A method for operating a camera arrangement for a vehicle, in which by means of at least one camera at least one image area of a surrounding of the vehicle is captured, the image area comprising a plurality of pixels and being arranged in front of the vehicle, the method comprising:
determining an average brightness of the at least one image area, wherein by means of a device for feature detection differences in the brightness of pixels differing from each other are identified in the at least one image area and possibly existing features characterizing abrupt changes in brightness are thus detected,
wherein a height of the at least one image area above the road surface is adjustable in dependence on an inclination of the vehicle.

13. The method according to claim 12, wherein a ratio of the pixels assigned to the detected features in relation to the total number of pixels in the at least one image area is determined and in dependence on the ratio it is concluded whether a tunnel is present or not.

14. The method according to claim 12, wherein, by the at least one camera, a second image area arranged below the first image area in front of the vehicle is captured, wherein an average brightness of the second image area is determined.

15. The method according to claim 14, wherein on the basis of the features detected in the first image area it is concluded whether a tunnel is present or not.

* * * * *